(12) United States Patent
Mizutani

(10) Patent No.: US 7,725,008 B2
(45) Date of Patent: May 25, 2010

(54) INFORMATION PROCESSING APPARATUS AND DECODING CONTROL METHOD

(75) Inventor: Fumitoshi Mizutani, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/392,002

(22) Filed: Feb. 24, 2009

(65) Prior Publication Data

US 2009/0245383 A1 Oct. 1, 2009

(30) Foreign Application Priority Data

Mar. 31, 2008 (JP) ............................. 2008-091728
Dec. 19, 2008 (JP) ............................. 2008-324332

(51) Int. Cl.
*H04N 7/00* (2006.01)
*H04N 7/26* (2006.01)
*H04B 1/66* (2006.01)

(52) U.S. Cl. ........................... 386/109; 386/46; 375/240

(58) Field of Classification Search ................... 386/46, 386/109, 111, 112, 124, 125; 375/240
See application file for complete search history.

(56) References Cited

U.S. PATENT DOCUMENTS

2007/0253491 A1* 11/2007 Ito et al. ................. 375/240.24
2008/0069244 A1* 3/2008 Yano ..................... 375/240.24

FOREIGN PATENT DOCUMENTS

JP 2002-057986 2/2002

* cited by examiner

*Primary Examiner*—Robert Chevalier
(74) *Attorney, Agent, or Firm*—Blakely, Sokoloff, Taylor & Zafman LLP

(57) ABSTRACT

According to one embodiment, the information processing apparatus includes an input module, a decoding module, a first analysis module, a second analysis module and a decoding control module. The first analysis module acquires the number of macroblocks, which are generated by dividing each image in a matrix pattern, in a row direction of each image. The second analysis module acquires a vertical position of each slice, which is formed by arranging the macroblocks in a row direction, within each image. The decoding control module sends as arguments an address representing both a start position in a horizontal direction of each image and the vertical position acquired by the second analysis module, and the number of macroblocks acquired by the first analysis module to cause the decoding module to execute decoding processing of the moving image stream for each slice.

13 Claims, 8 Drawing Sheets

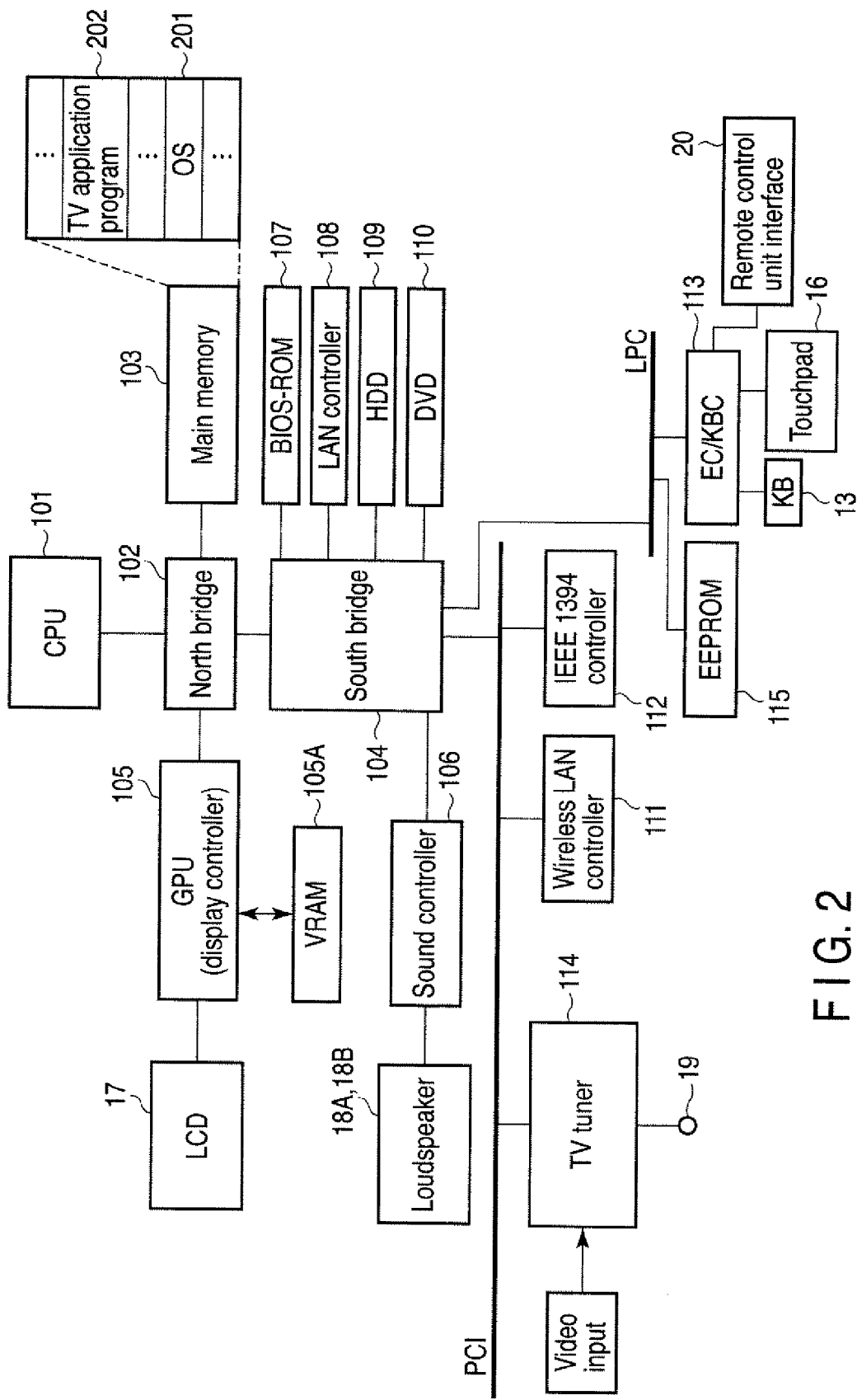
F I G. 2

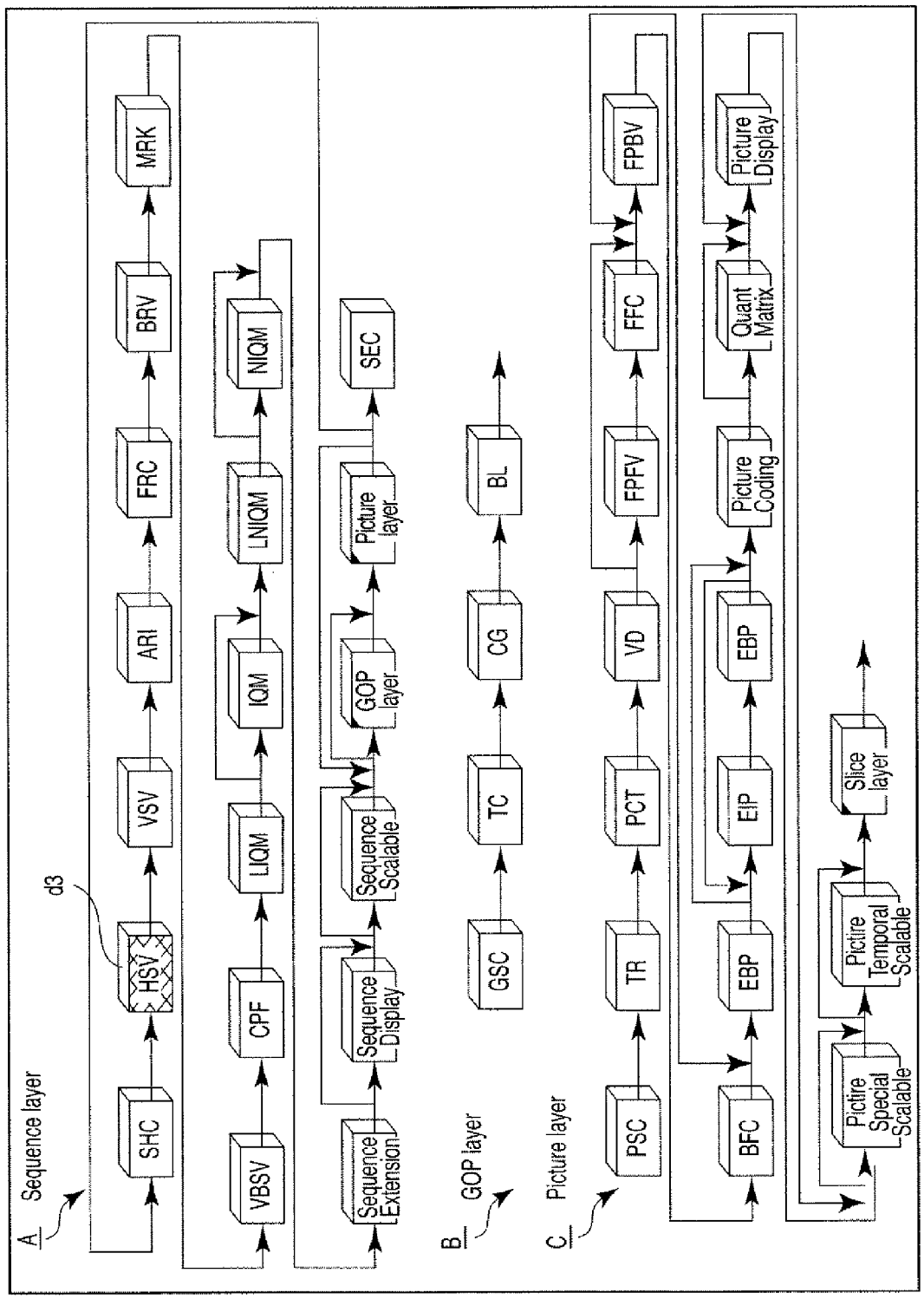
F I G. 5A

INFORMATION PROCESSING APPARATUS AND DECODING CONTROL METHOD

CROSS-REFERENCE TO RELATED APPLICATIONS

This application is based upon and claims the benefit of priority from Japanese Patent Applications No. 2008-091728, filed Mar. 31, 2008; and No. 2008-324332, filed Dec. 19, 2008, the entire contents of both of which are incorporated herein by reference.

BACKGROUND

1. Field

One embodiment of the invention relates to a moving image stream decoding control technique suitable for, e.g., a personal computer which includes a TV function of recording/playing back digital broadcast program data broadcast using television broadcast signals.

2. Description of the Related Art

In recent years, notebook type personal computers which can be driven by a battery and can be easily carried by users have widely prevailed. This type of computer is thinner and more lightweight, and has more advanced functions. Some computers which include a TV function for viewing digital television broadcast programs have become commercially available. By carrying this type of computer, therefore, the user can enjoy digital television broadcast programs even when he/she is away from home or on the move.

Along with the development of a wireless communication environment, it has become easier for the user to connect to the Internet even when he/she is away from home or on the move, and it has also become possible to receive digital television broadcast program data from a server to which the user connects via the Internet, and view them.

The digital broadcast program data is, e.g., a moving image stream compression-encoded by a scheme complying with the Moving Picture Experts Group (MPEG)-2 standard. Various mechanisms for efficiently decoding such compression encoded moving image stream have been proposed (e.g., see Jpn. Pat. Applin. KOKAI Publication No. 2002-57986).

Computers normally comprise a graphics accelerator (to be referred to as an accelerator hereinafter) which renders, in place of a CPU, images to be displayed by various application programs. These days, some accelerators which include a function of executing part of decoding processing for decoding a compression encoded moving image stream have become commercially available. Many of the computers including a TV function implement this TV function by software. In this case, the decoding processing of the moving image stream is executed by one module of the software running on the CPU. It is expected to considerably reduce the load on the CPU by making the accelerator execute part of the decoding processing.

A moving image stream compression-encoded by a scheme complying with the MPEG-2 standard has a hierarchical structure with six layers, i.e., a sequence layer, Group of Pictures (GOP) layer, picture layer, slice layer, macroblock layer, and block layer. Of them, the picture layer is paired with each image of the moving image and provided. The lower slice layer has image data sets (slices) having a predetermined division width and arbitrary lengths, which are generated by dividing each image horizontally. The arbitrary length intends that a plurality of slices can be provided in each row. Macroblocks are generated by dividing each image in a matrix pattern. That is, a slice is obtained by arranging these macroblocks in the row direction. As a typical example of the above described accelerators which include a function of executing part of the decoding processing for decoding the compression encoded moving image stream, there is an accelerator which receives each slice of the moving image stream, and executes the decoding processing.

This accelerator requires, as specifications, to receive a slice of the moving image stream to be decoded as well as, as arguments, an address representing the horizontal and vertical positions of the first macroblock of the slice within each image and the number of macroblocks contained in the slice. The software which makes the accelerator execute the decoding processing in the slice layer or the lower layer must refer to the slice layer or the lower layer to acquire the values given as arguments. Consequently, it is impossible to reduce the load on the CPU as much as expected.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary block diagram showing a system configuration of the information processing apparatus of the embodiment;

FIGS. 5A and 5B are exemplary views showing the structure of the moving image stream compression encoded by the scheme complying with the MPEG 2 standard;

DETAILED DESCRIPTION

Various embodiments according to the invention will be described hereinafter with reference to the accompanying drawings. In general, according to one embodiment of the invention, the information processing apparatus includes an input module, a decoding module, a first analysis module, a second analysis module and a decoding control module. The first analysis module acquires the number of macroblocks, which are generated by dividing each image in a matrix pattern, in a row direction of each image. The second analysis module acquires a vertical position of each slice, which is formed by arranging the macroblocks in a row direction, within each image. The decoding control module sends as arguments an address representing both a start position in a horizontal direction of each image and the vertical position acquired by the second analysis module, and the number of macroblocks acquired by the first analysis module to cause the decoding module to execute decoding processing of the moving image stream for each slice.

The configuration of an information processing apparatus according to the embodiment of the invention will be explained first with reference to FIGS. 1 and 2. The information processing apparatus of this embodiment is implemented as, e.g., a notebook type personal computer 10.

The computer 10 includes a television (TV) function for viewing and recording broadcast program data broadcast by television broadcast signals. This TV function is implemented by, e.g., a TV application program which has been installed in the computer 10 in advance.

Figure 1:
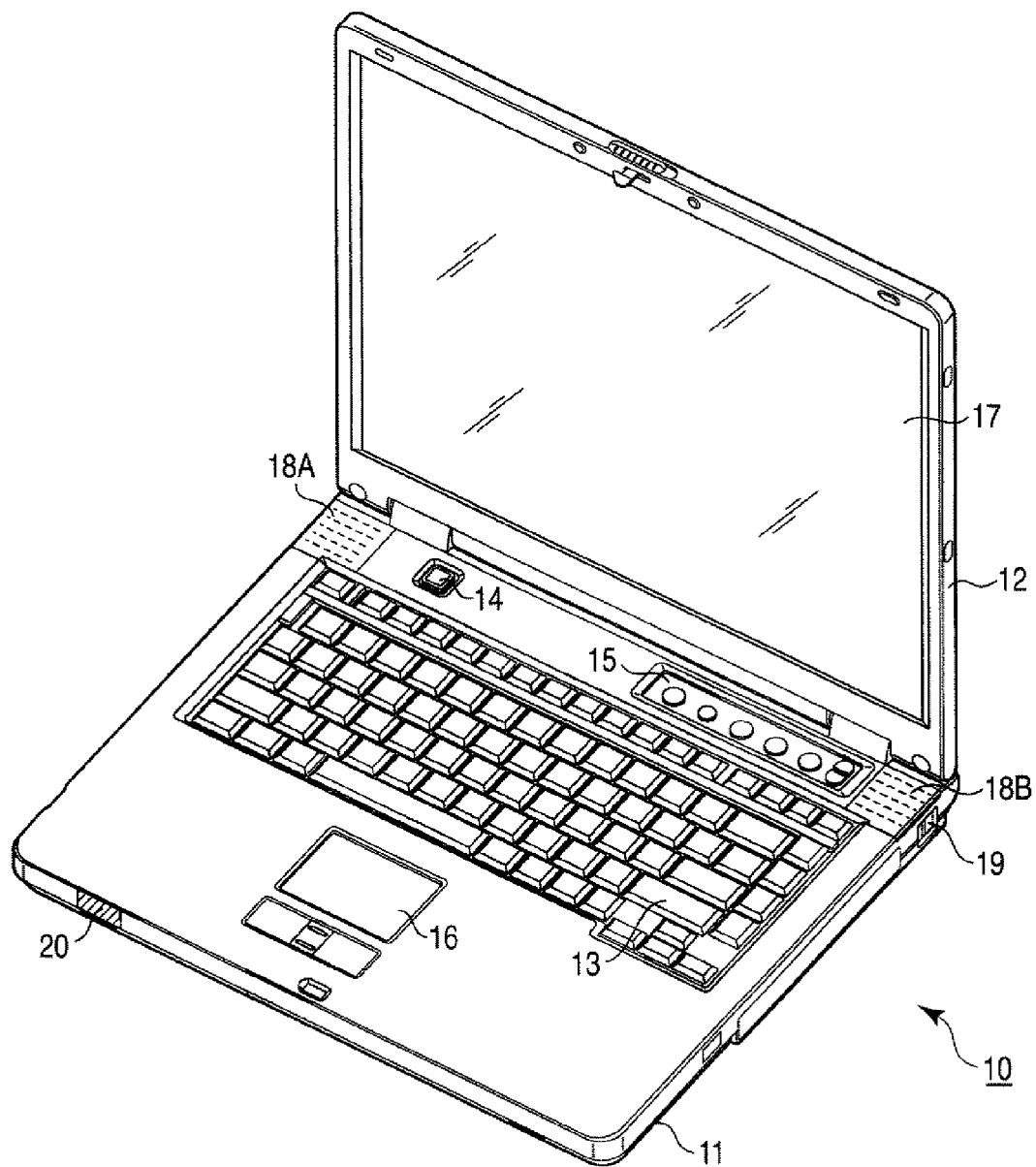
FIG. 1 is an exemplary perspective view showing an outer appearance of an information processing apparatus according to an embodiment of the invention.

FIG. 1 is an exemplary perspective view showing the computer 10, a display unit of which is opened. The computer 10 comprises a computer main body 11 and display unit 12. The display unit 12 integrates a display device including a liquid crystal display (LCD) 17.

The display unit 12 is attached to the computer main body 11 to be pivotal between the open position where the upper surface of the computer main body 11 is exposed and the close position where that upper surface is covered. The computer main body 11 has a thin box shape housing, on which a keyboard 13, a power button 14 for turning on/off the computer 10, an input operation panel 15, a touchpad 16, loudspeakers 18A and 18B, and the like are arranged.

The input operation panel 15 is an input device for inputting an event corresponding to a pressed button, and includes a plurality of buttons used to respectively start a plurality of functions. These buttons include a set of operation buttons for controlling the TV function.

A remote control unit interface 20 for communicating with a remote control unit which remotely controls the TV function of the computer 10 is provided on the front surface of the computer main body 11. The remote control unit interface 20 comprises an infrared signal receiving unit. An antenna terminal 19 for TV broadcasting is provided on, e.g., the right side surface of the computer main body 11.

The system configuration of the computer 10 will be described next with reference to FIG. 2.

As shown in FIG. 2, the computer 10 comprises a CPU 101, north bridge 102, main memory 103, south bridge 104, graphics processing unit (GPU) 105, video memory (VRAM) 105A, sound controller 106, BIOS ROM 107, LAN controller 108, hard disk drive (HDD) 109, DVD drive 110, wireless LAN controller 111, IEEE 1394 controller 112, embedded controller/keyboard controller IC (EC/KBC) 113, TV tuner 114, and EEPROM 115, etc.

The CPU 101 is a processor which controls the operation of the computer 10. The CPU 101 executes an operating system (OS) 201 and various application programs such as a TV application program 202 operating under the control of the OS 201, which are loaded from the hard disk drive (HDD) 109 to the main memory 103. The TV application program 202 is a software program or executing the above described TV function. The TV application program 202 executes live playback processing for viewing broadcast program data received by the TV tuner 114 as an encoded moving image stream, recording processing for recording the received broadcast program data in the HDD 109, and playback processing for playing back the broadcast program data/video data recorded in the HDD 109. The CPU 101 also executes a Basic Input/Output System (BIOS) stored in the BIOS ROM 107. The BIOS is a program for controlling the hardware.

The north bridge 102 is a bridge device which interconnects a local bus of the CPU 101 and the south bridge 104. The north bridge 102 incorporates a memory controller used to make access control of the main memory 103. The north bridge 102 includes a function of communicating with the CPU 105 via, e.g., a serial bus complying with the PCI Express standard.

The GPU 105 is a display controller which controls the LCD 17 used as a display monitor of the computer 10. A display signal generated by the GPU 105 is sent to the LCD 17. The GPU 105 incorporates an accelerator which renders, in place of the CPU 101, images to be displayed by the various application programs. The accelerator of the GPU 105 includes a function of executing, instead of the TV application program 202, part of the decoding processing of the encoded moving image stream received by the TV tuner 114. The computer 10 has been devised to efficiently decode the moving image stream by using the function of the accelerator, which will be explained later.

The south bridge 104 controls devices on a Low Pin Count (LPC) bus and those on a Peripheral Component Interconnect (PCI) bus. The south bridge 104 incorporates an Integrated Drive Electronics (IDE) controller for controlling the HDD 109 and the DVD drive 110. The south bridge 104 also includes a function of communicating with the sound controller 106.

The sound controller 106 is a sound generator, and outputs audio data to be played back to the loudspeakers 18A and 18B.

The wireless LAN controller 111 is a wireless communication device which performs wireless communication complying with, e.g., the IEEE 802.11 standard. The IEEE 1394 controller 112 communicates with an external apparatus via a serial bus complying with the IEEE 1394 standard.

The EC/KBC 113 is a 1-chip microcomputer on which an embedded controller for power management and the keyboard controller for controlling the keyboard (KB) 13 and touchpad 16 are integrated. The EC/KBC 113 includes a function of turning on/off the computer 10 in response to the user operation of the power button 14. The EC/KBC 113 also includes a function of communicating with the remote control unit interface 20.

The TV tuner 114 is a receiving device which receives broadcast program data broadcast by television broadcast signals, and is connected to the antenna terminal 19. The TV tuner 114 is implemented as, e.g., a digital TV tuner capable of receiving digital broadcast program data such as terrestrial digital TV broadcasting. The TV tuner 114 includes a function of capturing video data input from an external apparatus.

To help easy understanding of the principle of efficiently decoding the moving image stream by using the function of the accelerator of the GPU 105, which is implemented by the computer 10 including above described configuration, the general procedure of decoding the moving image stream by using the function of the accelerator of the CPU 105 will be explained with reference to FIGS. 3 to 5.

A scheme complying with the MPEG 2 standard as a common scheme of compression encoding moving images divides each image into macroblocks of 16×16 pixels, and encodes each of the macroblocks. A slice is formed by arranging the macroblocks in the row direction. FIG. 3 is an exemplary schematic view showing the relationship between each image (frame), slices, and macroblocks.

Figure 3:
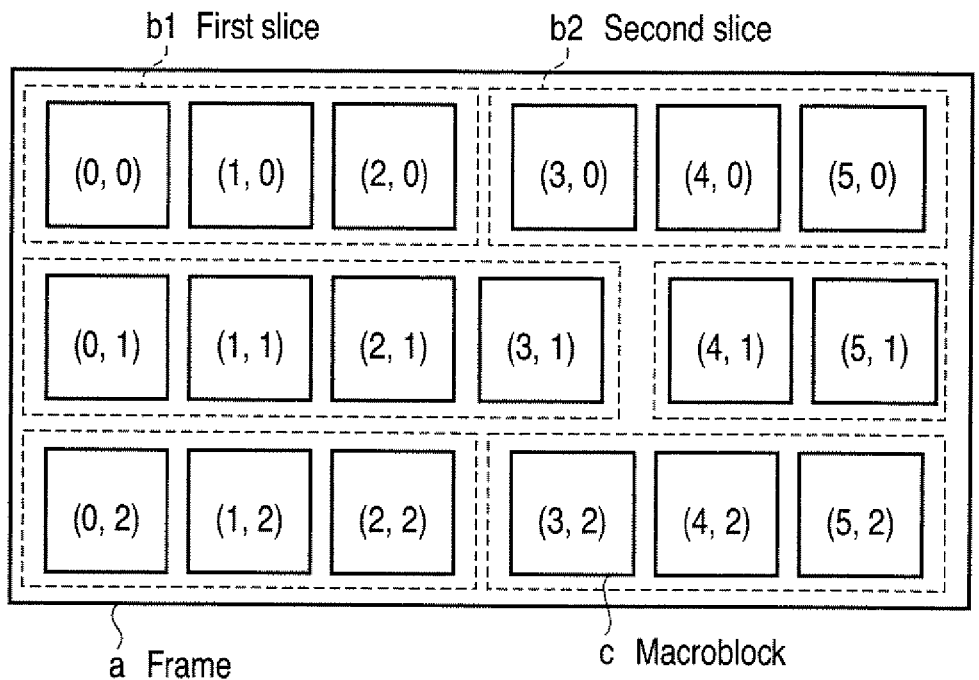
FIG. 3 is an exemplary schematic view showing the relationship between a frame, slices, and macroblocks in a moving image stream compression encoded by a scheme complying with the MPEG 2 standard.

As shown in FIG. 3, each frame "a" is divided into a plurality of slices "b1", "b2", . . . , and each slice "b1", "b2", . . . includes one or more macroblocks "c". The moving image stream compression encoded by a scheme complying with the MPEG 2 standard has a hierarchical structure with six layers, i.e., a sequence layer, GOP layer, picture layer, slice layer, macroblock layer, and block layer. For each frame "a", the picture layer is provided. For the plurality of slices "b1", "b2", . . . , the slice layer lower than the picture layer is provided. For the moving image stream with, e.g., 30 fps, the TV application program 202 needs to complete decoding processing for each picture layer within 1/30 sec.

The accelerator of the GPU 105 includes a function of executing the moving image stream decoding processing for each slice layer. The TV application program 202 makes the accelerator execute the decoding processing in the slice layer or the lower layer. When accepting each slice of the input moving image stream, the accelerator requires, as arguments, the position (address) of the first macroblock of the corresponding slice within the frame, and the number of macroblocks contained in the corresponding slice. As for the example shown in FIG. 3, when making the accelerator execute the decoding processing of the second slice "b2", the TV application program 202 needs to inform the accelerator that the address of the first macroblock of the slice "b2" is (3, 0) and that the slice "b2" contains three macroblocks.

Figure 4:
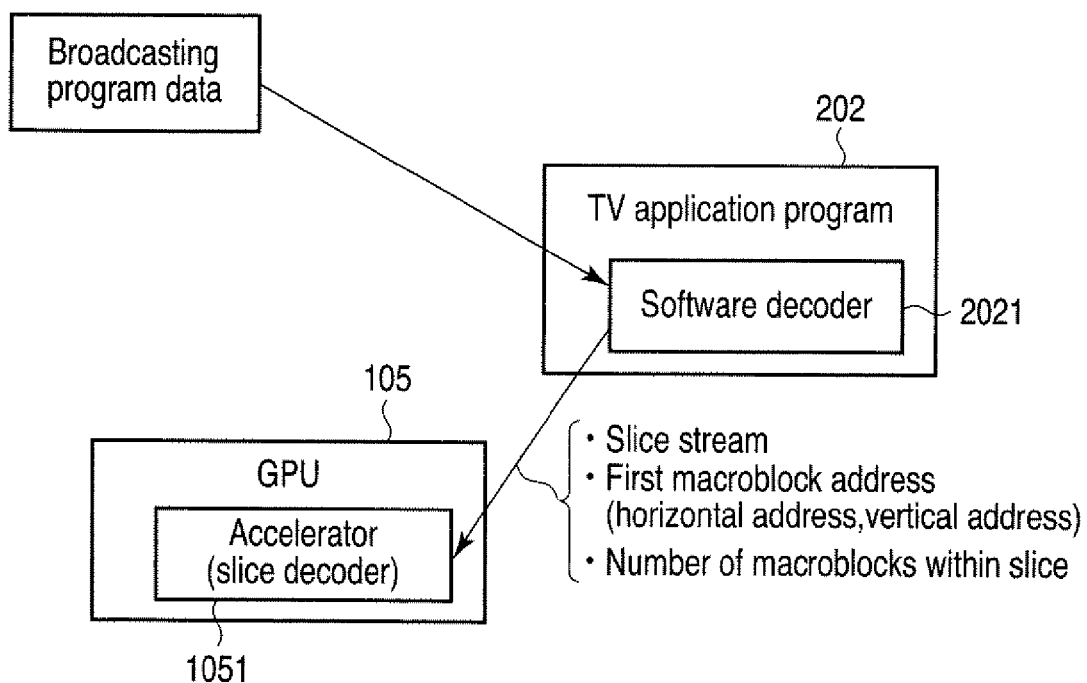
FIG. 4 is an exemplary schematic view showing the relationship between an accelerator of a GPU and a software decoder of a TV application program running on the information processing apparatus of the embodiment.

That is, as shown in FIG. 4, in the TV application program 202 for playing back the broadcast program data, a software decoder 2021 which controls the decoding processing supplies each slice of the moving image stream (each slice stream) to an accelerator 1051 of the GPU 105, and simultaneously provides the first macroblock address and the number of macroblocks within the corresponding slice.

Figure 5B:
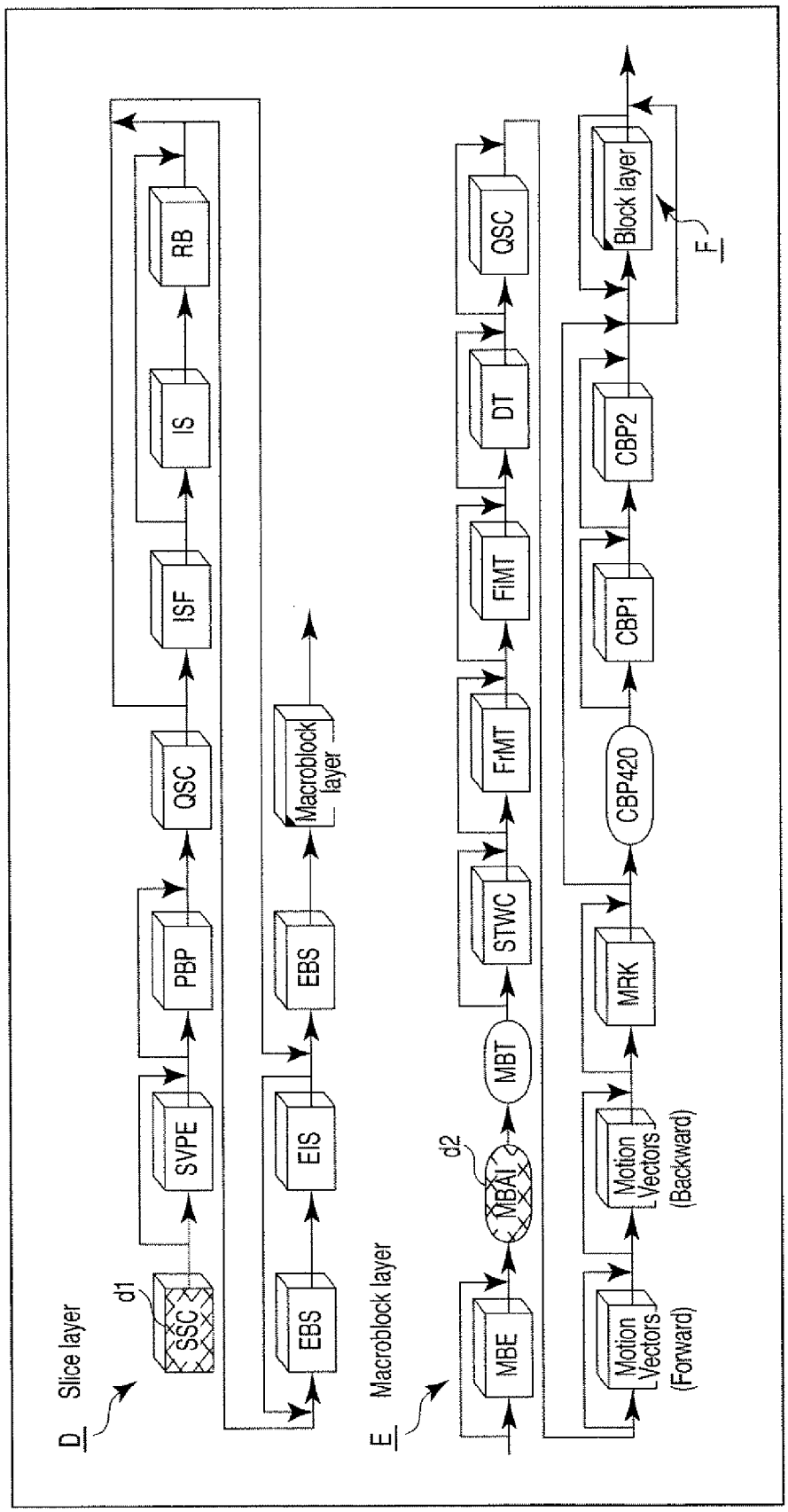

FIGS. 5A and 5B are exemplary views showing the structure of the moving image stream compression encoded by the scheme complying with the MPEG 2 standard.

As described above, the moving image stream compression encoded by the scheme complying with the MPEG 2 standard has a hierarchical structure with six layers, i.e., a sequence layer "A", GOP layer "B", picture layer "C", slice layer "D", macroblock layer "E", and block layer "F", as shown in FIG. 5. How to acquire, according to a general procedure, the first macroblock address and the number of macroblocks within a slice, which are supplied to the accelerator 1051 of the GPU 105 by the software decoder 2021 of the TV application program 202 will now be described.

It is necessary to acquire the vertical and horizontal positions for the first macroblock address. The vertical position is that of the slice, and its value is contained in the header field "d1" in the slice layer. On the other hand, it is impossible to acquire the horizontal position unless the macroblock address increment (MBAI ["d2"]) in each macroblock layer lower than the slice layer is referred to from the start position of each row. In the example shown in FIG. 3, it is necessary to refer to the MBAI of each macroblock layer of the first slice b1 to acquire the horizontal position "3" of the first macroblock of the second slice "b2". This is because the MBAI does not store an absolute value which solely specifies the horizontal position within each image but stores a relative position (the number of skips) from a macroblock corresponding to the immediately preceding macroblock layer so as to eliminate information on a macroblock having little code amount from the moving image stream.

It is impossible to acquire the number of macroblocks within each slice unless the MBAI of each macroblock layer lower than the slice layer is referred to, for the same reason as that in a case of acquiring the horizontal position of the first macroblock. In the example shown in FIG. 3, it is necessary to refer to the MBAI of each macroblock layer of the first slice "b1" to acquire the fact that the first slice "b1" contains three macroblocks.

That is, the software decoder 2021 of the TV application program 202 makes the accelerator 1051 of the CPU 105 execute the decoding processing in the slice layer or the lower layer of the moving image stream. It is, however, necessary to analyze the slice layer or the lower layer to acquire the horizontal position of the first macroblock of the slice and the number of macroblocks contained in the slice.

Figure 6:
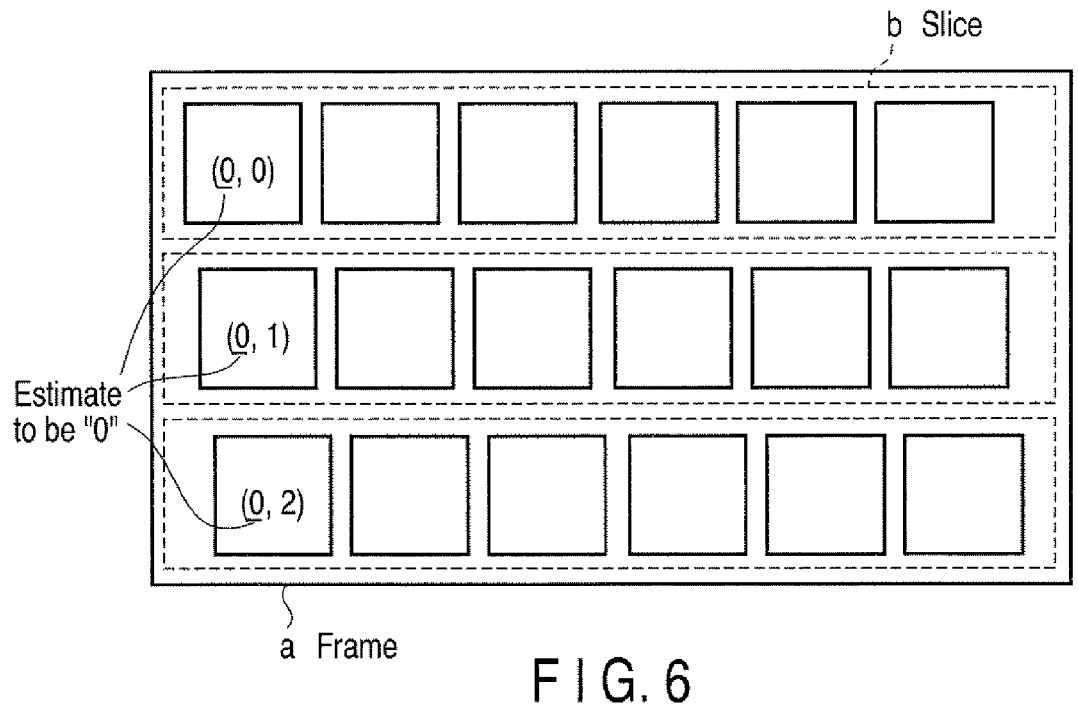
FIG. 6 is an exemplary first view for explaining the basic principle of a simplification of interpretation processing in decoding the moving image stream, which is executed on the information processing apparatus of the embodiment.
Figure 7:
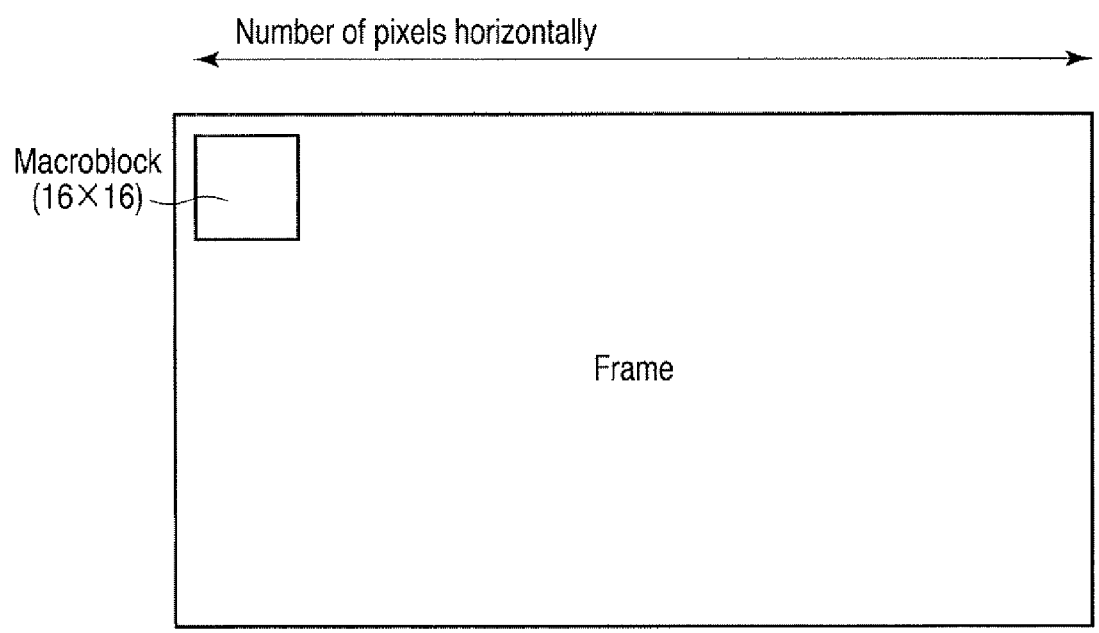
FIG. 7 is an exemplary second view for explaining the basic principle of the simplification of the interpretation processing in decoding the moving image stream, which is executed on the information processing apparatus of the embodiment.

Consider the fact that broadcast program data broadcast by television broadcast signals (or broadcast program data distributed via the Internet) form a moving image stream in which a row of each image is regarded as a slice. Firstly, the computer 10 always sets the horizontal position of the first macroblock of each slice to the start position ("0") of each row, as shown in FIG. 6. Secondly, the computer 10 uses a value obtained by dividing the number of pixels horizontally of each image by the number of pixels horizontally of a macroblock as the number of macroblocks contained in each slice, as shown in FIG. 7. The number of pixels horizontally of each image is contained in the header field "d3" in the sequence layer.

This eliminates the need for analyzing the slice layer or the lower layer by the software decoder 2021 of the TV application program 202 which makes the accelerator 1051 of the GPU 105 execute the decoding processing in the slice layer or the lower layer of the moving image stream, thereby simplifying the analysis processing.

Consider a case in which a slice of the moving image stream is lost because, e.g., an environment for receiving broadcast program data by the TV tuner 114 has not been prepared. In the case of the general decoding procedure, since it is necessary to acquire information (the horizontal position of the first macroblock) for decoding succeeding slices from the lost slice, this frame itself must be discarded. To the contrary, since the computer 10 does not acquire information necessary for decoding a certain slice from the immediately preceding slice, it is possible to limit the influence of the loss to the lost slice.

Assume that a plurality of slices form a row, and the accelerator 1051 of the GPU 105 abnormally terminates the decoding processing due to inconsistency in the arguments. In this case, the software decoder 2021 of the TV application program 202 acquires the first macroblock address and the number of macroblocks within a slice by using the general procedure, and requests the accelerator 1051 of the GPU 105 to decode the slice again. The software decoder 2021 of the TV application program 202 employs the general procedure within the range of the row containing the slice for which the decoding processing has abnormally terminated.

The software decoder 2021 of the TV application program 202 may be designed to simultaneously acquire, with low priority, both the first macroblock address and the number of macroblocks within the slice in accordance with the general procedure in consideration of the load on the CPU 101 in case the accelerator 1051 of the GPU 105 abnormally terminates the decoding processing due to inconsistency in the arguments.

Figure 8:
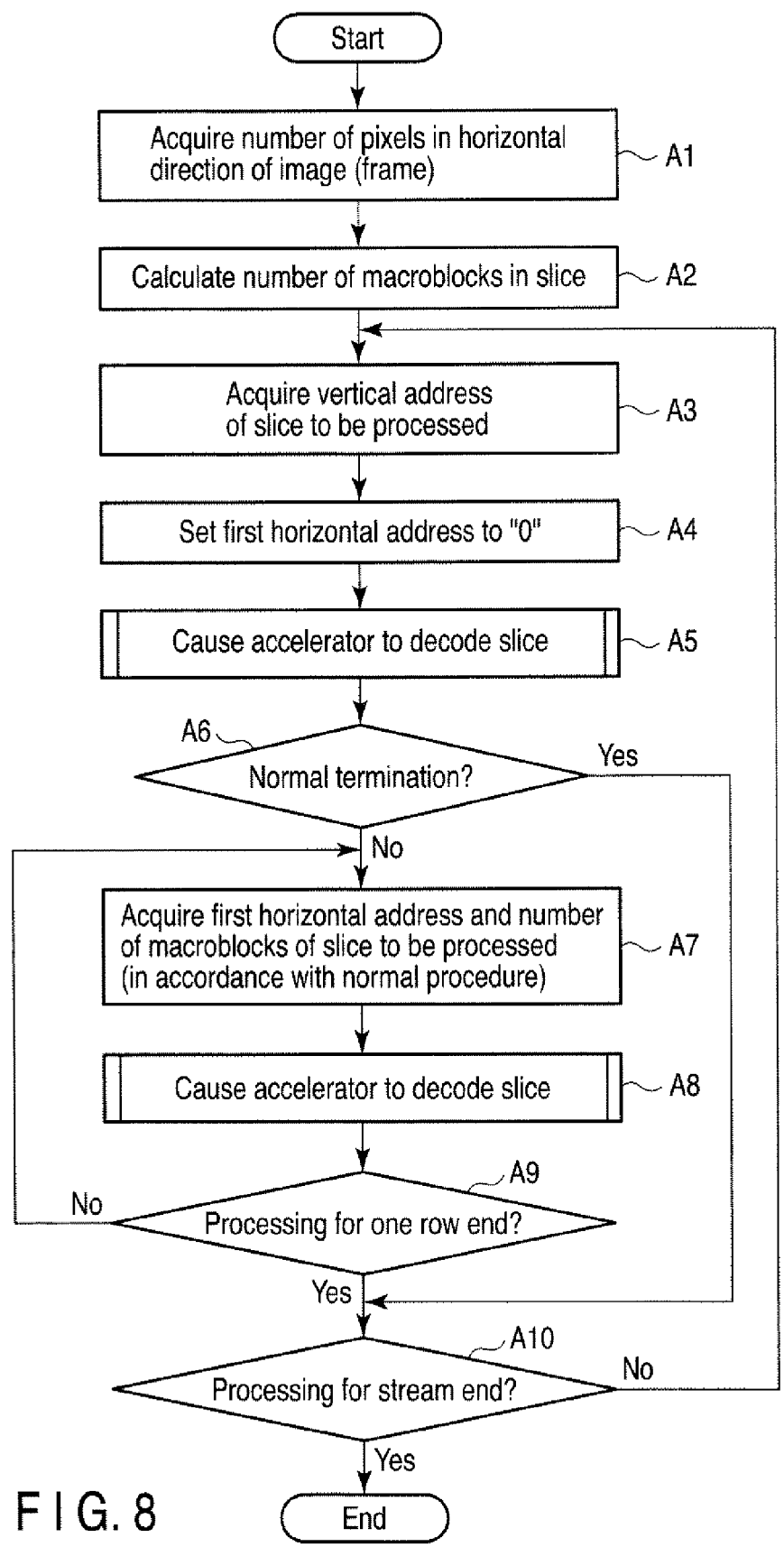
FIG. 8 is an exemplary flowchart showing the operation procedure of the moving image stream decoding processing by the information processing apparatus of the embodiment.

FIG. 8 is an exemplary flowchart showing the operation procedure of the decoding processing of the moving image stream by the computer 10.

First, the software decoder 2021 of the TV application program 202 acquires the number of pixels horizontally of each image from the header field (HS in the sequence layer) of the moving image stream (block A1). The decoder 2021 calculates the number of macroblocks horizontally of each image by dividing the acquired number of pixels horizontally of each image by the number of pixels horizontally of a macroblock (block A2). The software decoder 2021 of the TV application program 202 uses the calculated value as the number of macroblocks contained in each slice, which is an argument given to the accelerator 1051 of the GPU 105.

For each slice, the software decoder 2021 of the TV application program 202 acquires the vertical position of the corresponding slice from its header field (SSC in the slice layer), and sets the acquired value as the vertical position of the first macroblock of the corresponding slice, which is an argument given to the accelerator 1051 of the GPU 105 (block A3). On the other hand, the software decoder 2021 of the TV application program 202 determines that the value of the horizontal position of the first macroblock of the corresponding slice as an argument given to the accelerator 1051 of the GPU 105 is "0" (the start position of a row), and sets the value (block A4).

The software decoder 2021 of the TV application program 202 then gives a slice of the moving image stream, and causes the accelerator 1051 of the GPU 105 to execute the decoding processing of the moving image stream (block A5). If the processing abnormally terminates due to inconsistency in the arguments (NO in block A6), the software decoder 2021 of the TV application program 202 acquires the horizontal position of the first macroblock of the slice and the number of macroblocks in accordance with the general procedure (block A7). The decoder 2021 causes the accelerator 1051 of the GPU 105 to execute the decoding processing of the moving image stream again with respect to the slice for which the decoding processing has abnormally terminated (block A8). The software decoder 2021 of the TV application program 202 acquires the horizontal position of the first macroblock of the slice and the number of macroblocks in accordance with the general procedure within the range of the row containing the slice for which the decoding processing has abnormally terminated while causing the accelerator 1051 of the GPU 105 to execute the decoding processing of the moving image stream (blocks A7 to A9).

If the decoding processing of the moving image stream normally ends (YES in block A6) or if the decoding processing of all slices of the row containing the slice for which the decoding processing has abnormally terminated (YES in block A9), the software decoder 2021 of the TV application program 202 checks if the moving image stream ends (block A10). If there exists a succeeding moving image stream (NO in block A10), the decoder 2021 repeats the processing from block A3; otherwise (YES in block A10), the software decoder 2021 of the TV application program 202 ends the moving image stream decoding processing.

Figure 9:
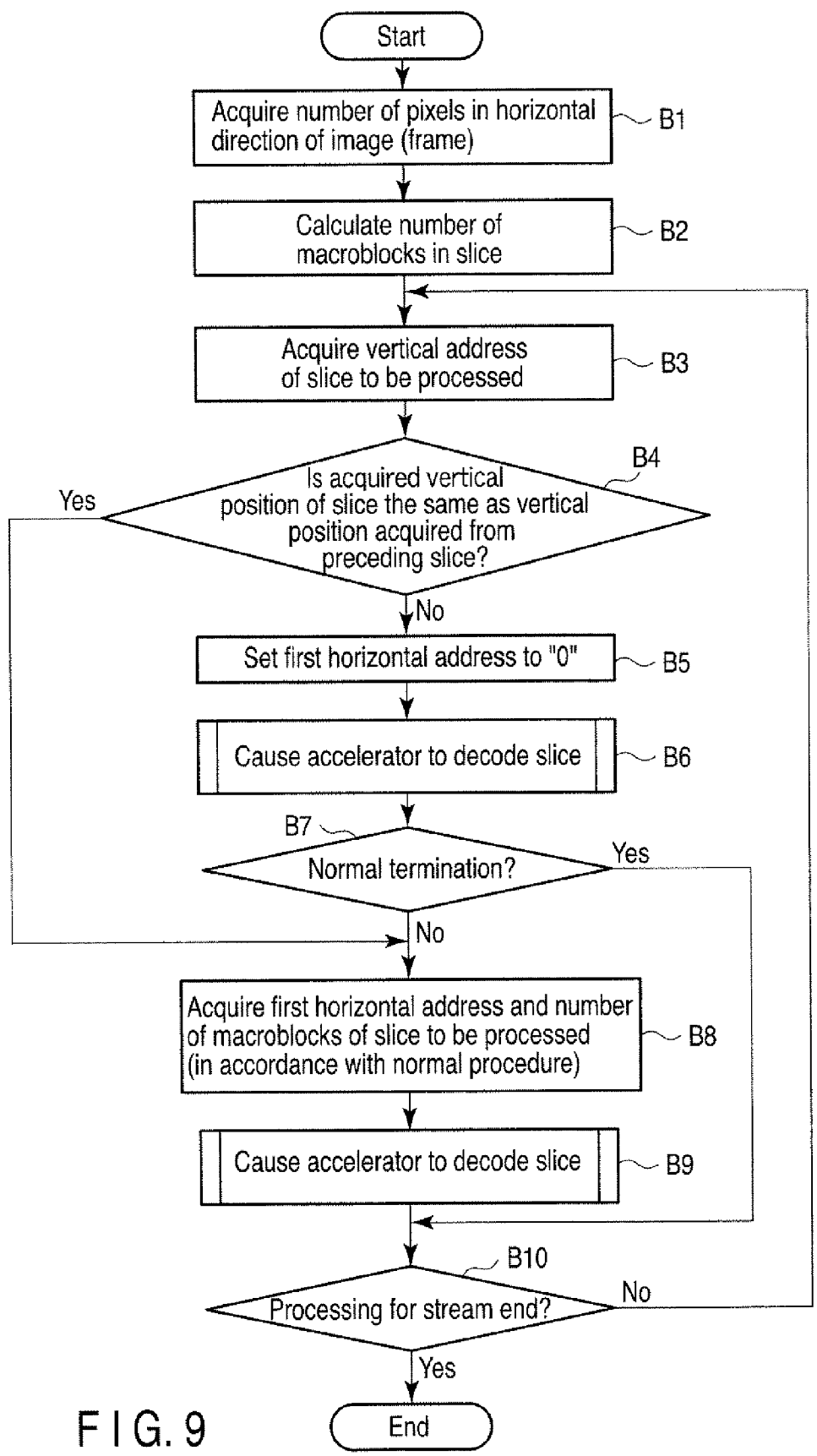
FIG. 9 is an exemplary second flowchart showing the operation procedure of the moving image stream decoding processing by the information processing apparatus of the embodiment.

FIG. 9 is a flowchart showing the operation procedure of the moving image stream decoding processing which the computer 10 performs. FIG. 9 specifically shows a procedure for coping with the case where a plurality of slices are included in one row.

First, the software decoder 2021 of the TV application program 202 acquires the number of pixels horizontally of each image from the header field (HS in the sequence layer) of the moving image stream (block B1). The decoder 2021 calculates the number of macroblocks horizontally of each image by dividing the acquired number of pixels horizontally of each image by the number of pixels horizontally of a macroblock (block B2). The software decoder 2021 of the TV application program 202 acquires a vertical position of each slice from the header field (SSC in the slice layer) of the slice (block B3).

The software decoder 2021 of the TV application program 202 determines whether or not the acquired vertical position of a slice is the same value as the vertical position of the preceding slice (block B4). If the acquired vertical position does not (NO in block B4), the software decoder 2021 of the TV application program 202 uses the number of horizontal macroblocks of each image, which is calculated previously, as the number of macroblocks included in each slice, which is one element of the arguments to be supplied to the accelerator 1051 of the GPU 105. In addition, the software decoder 2021 of the TV application program 202 uses the acquired vertical position of each slice as the vertical position of the first macroblock of each slice, which is one element of the arguments to be supplied to the accelerator 1051 of the GPU 105. Furthermore, the software decoder 2021 of the TV application program 202 assigns "0" (the start position of a row) to the horizontal position of the first macroblock of the slice, which is one element of the arguments to be supplied to the accelerator 1051 of the GPU 105 (block B5). After a moving picture stream corresponding to one slice is provided in this manner, the software decoder 2021 of the TV application program 202 causes the accelerator 1051 of the GPU 105 to decode the moving picture stream (block B6).

If this processing ends in failure due to unmatched arguments (NO in block 57), the software decoder 2021 of the TV application program 202 acquires the horizontal position of the first macroblock of a slice and the number of macroblocks by use of ordinary procedures (block B8), and causes the accelerator 1051 of the GPU 105 to re-execute the decoding processing with respect to the moving picture stream including the slice for which the processing ended in failure (block 59).

If the acquired vertical position of the slice is the same as the vertical position acquired from the preceding slice (YES in block B4), it is assumed that the slice is one of the second and subsequent slices included in one row. At this point in time, the software decoder 2021 of the TV application program 202 acquires the horizontal position of the first macroblock of the slice and the number of macroblocks (block B8), and causes the accelerator 1051 of the GPU 105 to execute decoding processing with respect to the moving picture stream regarding the slice (block B9).

Then, the software decoder 2021 of the TV application program 202 checks whether or not there is a succeeding moving picture stream (block B10). If the succeeding moving picture stream exists (NO in block B10), the processing starting with block B3 is repeated. On the other hand, if the succeeding moving picture does not exist (YES in block B10), the decoding processing of the moving picture stream is ended.

As described above, in the computer 10, the software decoder 2021 of the TV application program 202 implements the simplification of the analysis processing for making the accelerator 1051 of the GPU 105 execute part of the decoding processing of the encoded moving image stream.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

What is claimed is:

1. An information processing apparatus comprising:
   an input module configured to input a moving image stream encoded for respective macroblocks of n×n pixels, the macroblocks being generated by dividing each image in a matrix pattern;
   a decoding module configured to receive, for each slice formed by arranging the macroblocks in a row direction, an address representing horizontal and vertical positions of a first macroblock of each slice within each image and the number of macroblocks contained in each slice as arguments to decode the moving image stream input by the input module;
   a first analysis module configured to acquire first information on the number of pixels in a horizontal direction of each image, the first information being contained in a header field of the moving image stream input by the input module, and the first analysis module configured to calculate the number of macroblocks in a row direction of each image from the first information;
   a second analysis module configured to acquire second information on a vertical position of each slice within each image, the second information being contained in a header field of each slice of the moving image stream input by the input module; and
   a decoding control module configured to send as arguments an address representing both a start position in a horizontal direction of each image as a horizontal position of a first macroblock of each slice within each image and the vertical position acquired by the second analysis module as a vertical position of a first macroblock of each slice within each image, and the number of macroblocks calculated by the first analysis module as the number of macroblocks contained in each slice to cause the decoding module to execute decoding processing of the moving image stream for each slice.

2. The information processing apparatus of claim 1, further comprising:
   a third analysis module configured to acquire a horizontal position of a first macroblock of each slice within each image and the number of macroblocks contained in each slice by referring to information of each macroblock of the moving image stream input by the input module from a first macroblock of a row of each image,
   wherein the decoding control module is further configured to acquire, when the decoding module abnormally terminates the decoding processing of the moving image stream for a slice due to inconsistency in the argument, a horizontal position of a first macroblock of the slice within the image and the number of macroblocks contained in the slice by using the third analysis module, and to send as arguments the acquired values together with the vertical position acquired by the second analysis module to cause the decoding module to execute the decoding processing of the moving image stream again for the slice for which the decoding processing has abnormally terminated.

3. The information processing apparatus of claim 2, wherein the decoding control module acquires, for a slice that succeeds the slice for which the decoding processing has abnormally terminated and is in the same row on the image as that of the slice for which the decoding processing has abnormally terminated, a horizontal position of a first macroblock of the slice within the image and the number of macroblocks contained in the slice by using the third analysis module, and sends as arguments the acquired values together with the vertical position acquired by the second analysis module to cause the decoding module to execute the decoding processing of the moving image stream.

4. The information processing apparatus of claim 2, wherein the decoding control module is further configured to simultaneously cause, when causing the decoding module to execute the decoding processing of the moving image stream for a slice, the third analysis module to acquire a horizontal position of a first macroblock of the slice within each image and the number of macroblocks contained in the slice.

5. The information processing apparatus of claim 1, wherein the input module inputs digital broadcast program data broadcast by a television broadcast signal as the moving image stream.

6. The information processing apparatus of claim 1, wherein the input module inputs the moving image stream from a server connected via a computer network.

7. The information processing apparatus of claim 1, wherein the moving image stream is obtained by compression encoding a moving image by a scheme complying with the Moving Picture Experts Group (MPEG)-2 standard.

8. The information processing apparatus of claim 1, further comprising:
   a third analysis module configured to acquire a horizontal position of a first macroblock of each slice within each image and the number of macroblocks contained in each slice by referring to information of each macroblock of the moving image stream input by the input module from a first macroblock of a row of each image,
   wherein the decoding control module acquires, when the information on the vertical position acquired by the second analysis module is an identical value of the information on the vertical position acquired from a preceding slice, a horizontal position of a first macroblock of the slice within the image and the number of macroblocks contained in the slice by using the third analysis module, and sends as arguments the acquired values together with the vertical position acquired by the second analysis module to cause the decoding module to execute the decoding processing of the moving image stream.

9. A decoding control method for an information processing apparatus including an input module configured to input a moving image stream encoded for respective macroblocks of n×n pixels, the macroblocks being generated by dividing each image in a matrix pattern, and the information processing apparatus further including a decoding module configured to receive, for each slice formed by arranging the macroblocks in a row direction, an address representing horizontal and vertical positions of a first macroblock of each slice within each image and the number of macroblocks contained in each slice as arguments to decode the moving image stream input by the input module, the method comprising:
   acquiring first information on the number of pixels in a horizontal direction of each image, the first information being contained in a header field of the moving image stream input by the input module, and calculating the number of macroblocks in a row direction of each image from the information on the number of pixels horizontally;

acquiring second information on a vertical position of each slice within each image, the second information being contained in a header field of each slice of the moving image stream input by the input module; and sending as arguments an address representing both a start position in a horizontal direction of each image as a horizontal position of a first macroblock of each slice within each image and the acquired vertical position as a vertical position of a first macroblock of each slice within each image, and the calculated number of macroblocks as the number of macroblocks contained in each slice to cause the decoding module to execute decoding processing of the moving image stream for each slice.

10. The decoding control method of claim 9, further comprising acquiring, when the decoding module abnormally terminates the decoding processing of the moving image stream for a slice due to inconsistency in the argument, a horizontal position of a first macroblock of the slice within the image and the number of macroblocks contained in the slice by referring to information of each macroblock of the moving image stream input by the input module from a first macroblock of a row of the image, and sending as arguments the acquired values together with the acquired vertical position to cause the decoding module to execute the decoding processing of the moving image stream again for the slice for which the decoding processing has abnormally terminated.

11. The decoding control method of claim 10, further comprising acquiring, for a slice that succeeds the slice for which the decoding processing has abnormally terminated and is in the same row on the image as that of the slice for which the decoding processing has abnormally terminated, a horizontal position of a first macroblock of the slice within the image and the number of macroblocks contained in the slice by referring to information of each macroblock of the moving image stream input by the input module from a first macroblock in a row of each image, and sending as arguments the acquired values together with the acquired vertical position to cause the decoding module to execute the decoding processing of the moving image stream.

12. The decoding control method of claim 10, further comprising simultaneously acquiring, when causing the decoding module to execute the decoding processing of the moving image stream for a slice, a horizontal position of a first macroblock of the slice within the image and the number of macroblocks contained in the slice by referring to information of each macroblock of the moving image stream input by the input module from a first macroblock in a row of the image.

13. The decoding control method of claim 9, further comprising acquiring, when the information on the acquired vertical position is an identical value of the information on the vertical position acquired from a preceding slice, a horizontal position of a first macroblock of the slice within the image and the number of macroblocks contained in the slice by referring to information of each macroblock of the moving image stream input by the input module from a first macroblock in a row of each image, and sending as arguments the acquired values together with the acquired vertical position to cause the decoding module to execute the decoding processing of the moving image stream.

* * * * *